(12) United States Patent
Trapp

(10) Patent No.: US 7,024,852 B2
(45) Date of Patent: Apr. 11, 2006

(54) MULTI-PURPOSE VALVE

(75) Inventor: Manfred Trapp, Plochingen (DE)

(73) Assignee: DaimlerChrysler AG, Stuttgart (DE)

( * ) Notice: Subject to any disclaimer, the term of this patent is extended or adjusted under 35 U.S.C. 154(b) by 76 days.

(21) Appl. No.: 10/805,641

(22) Filed: Mar. 20, 2004

(65) Prior Publication Data

US 2004/0177608 A1     Sep. 16, 2004

Related U.S. Application Data

(63) Continuation-in-part of application No. PCT/EP03/08921, filed on Aug. 12, 2003.

(51) Int. Cl.
*F01N 3/00*     (2006.01)

(52) U.S. Cl. .............................. 60/289; 60/290; 60/292; 60/293; 60/307; 137/351; 137/614.2; 251/82

(58) Field of Classification Search .................. 60/289, 60/290, 291, 292, 293, 307; 137/338, 351, 137/614.2, 855; 251/82
See application file for complete search history.

(56) References Cited

U.S. PATENT DOCUMENTS

| 4,191,013 | A | * | 3/1980 | Katahira et al. ............... 60/276 |
| 4,232,517 | A | * | 11/1980 | Sumiyoshi et al. ........... 60/276 |
| 4,270,347 | A | * | 6/1981 | Fukuba et al. ................. 60/276 |
| 5,203,872 | A | * | 4/1993 | Naffziger ..................... 251/82 |
| 5,421,366 | A | * | 6/1995 | Naffziger et al. ........ 137/614.2 |
| 6,453,667 | B1 | * | 9/2002 | Everingham .................. 60/289 |

FOREIGN PATENT DOCUMENTS

| DE | 42 04 415 A1 | 8/1993 |
| DE | 197 31 622 A1 | 1/1999 |
| EP | 0 480 787 A1 | 4/1992 |

\* cited by examiner

*Primary Examiner*—Binh Q. Tran
(74) *Attorney, Agent, or Firm*—Klaus J. Bach

(57) ABSTRACT

In an electrical multi-purpose valve for supplying secondary air into an exhaust system of an internal combustion engine, in which a power-actuated closing member controls a valve orifice in a passage between an inlet from an air supply line and an outlet to the exhaust system, a non-return valve is arranged downstream of the closing body in the direction of the flow of the air through the valve between the non-return valve and the valve outlet, and baffle devices are provided which deflect exhaust gas entering the valve from the outlet at least once by an angle of about 90°.

6 Claims, 2 Drawing Sheets

MULTI-PURPOSE VALVE

This is a Continuation-In-Part Application of international application PCT/EP03/08921 filed Aug. 12, 2003 and claiming the priority of German application 102 40 265.5 filed Aug. 31, 2002.

BACKGROUND OF THE INVENTION

The invention relates to a multi-purpose power actuated valve for supplying secondary air to an exhaust system of an internal combustion engine.

As a rule, for the treatment of exhaust gases from an internal combustion engine, secondary air is supplied to the exhaust gas, with the result that the pollutants in the exhaust gas are reduced because of further exothermal reactions in the exhaust system. Furthermore, a catalytic converter, which may be present in the exhaust system, is heated up. For this purpose, a secondary-air pump is used, which is connected with its discharge side to the exhaust gas duct via a secondary-air switching valve. The secondary-air switching valve is combined with a non-return valve so as to prevent exhaust gas from entering the secondary-air duct in operating phases in which the pressure of the secondary-air pump is lower than the exhaust gas pressure or when the secondary-air pump is not in operation.

The components of the secondary-air supply system have to be protected against the hot exhaust gases, since they would be damaged, and, under certain conditions, an engine fire could occur due to a flame flashback. In order to protect the secondary-air switching valve itself against damage from the hot exhaust gases and ensure its operating reliability, it is known from DE 197 31 622 A1 to provide for the secondary-air switching valve, which, as a rule, is vacuum- or pressure-controlled, an additional non-return valve, which is arranged between the secondary-air switching valve and the exhaust system.

Furthermore, DE 42 04 415 A1 discloses a multi-purpose valve, in particular for secondary-air pumps in internal combustion engines with a regulated three-way catalytic converter. Said valve has a valve housing which is provided with a valve inlet and a valve outlet and in which a pneumatically actuated cutoff valve and a non-return valve located downstream of the latter in the direction of flow are integrated. This type of multi-purpose valve is designated below as "pneumatic multi-purpose valve". At the present time, novel multi-purpose valves are being developed, which consist of an electrically actuated cutoff valve and, like-wise, of a non-return valve located downstream of the latter in the direction of flow. This type of multi-purpose valve is designated below as "electrical multi-purpose valve".

The housing of the pneumatic or electrical multi-purpose valve is subdivided, in the region of a non-return valve plate, into a housing upper part and a housing lower part, the non-return valve plate being held between the two housing parts. The outlet of the multi-purpose valve is arranged axially parallel, or at an angle, to the passage orifices in the non-return valve plate and a duct part widens in a funnel-like manner toward the passage openings.

In newer internal combustion engines with exhaust gas turbochargers, the exhaust gas temperature and exhaust gas pressure may be so high that, under certain circumstances, the prescribed specifications can no longer be maintained by the known secondary-air switching valves or multi-purpose valves.

It is the object the invention to improve the useful life of a multi-purpose valve while it can accommodate higher exhaust gas pressures and/or exhaust gas temperatures and, in the case of the electrical multi-purpose valve, to improve the electrical design, or, in general, to make it possible to permit their use in certain sensitive locations.

SUMMARY OF THE INVENTION

In an electrical multi-purpose valve for supplying secondary air into an exhaust system of an internal combustion engine, in which a power-actuated closing member controls a valve orifice in a passage between an inlet from an air supply line and an outlet to the exhaust system, a non-return valve is arranged downstream of the closing body in the direction of the flow of the air through the valve between the non-return valve and the valve outlet, and baffle devices are provided which deflect exhaust gas entering the valve from the outlet at least once by an angle of about 90°.

As a result, the non-return valve and the switching valve of the multi-purpose valve are not subjected directly to any hot exhaust gases, but only after the exhaust gases have been deflected once or more than once for the purpose of energy reduction and have passed over relatively long flow paths through the lower valve housing. When they then, impinge onto the latter, they have a lower pressure and/or a lower temperature.

Devices of this type expediently comprise a baffle plate which is arranged parallel, or at an angle, to the non-return valve and which separates a pre-chamber facing the non-return valve from a deflection chamber connected to the valve outlet. A passage orifice is arranged, offset to the valve orifice of the non-return valve, in the baffle plate, so that the exhaust gases cannot flow directly through the passage orifice to the valve orifice, but are deflected.

The baffle plate can be inserted in a space-saving way into the housing lower part of the multi-purpose valve, thus forming, toward the non-return valve, a pre-chamber separated by the baffle plate from a deflection chamber which is connected to the valve outlet. The outlet is expediently arranged as far as possible from the passage orifice and also offset in relation to the latter, so that the exhaust gases are several times deflected within the housing lower part in a small construction space.

A further deflection of the exhaust gases in the housing lower part can be achieved in that the shortest connection between the passage orifice in the baffle plate and the outlet or a duct piece adjoining the outlet toward the passage orifice is blocked by a baffle wall adapted to the spatial conditions. The baffle wall extends transversely to the baffle plate. Exhaust gases which pass through the outlet into the housing lower part impinge first onto the baffle wall and/or valve housing wall and are deflected upwardly by the baffle plate and have to flow around said wall, and only thereafter pass through the passage orifice of the baffle plate from the deflection chamber into the pre-chamber of the multi-purpose valve. Owing to the deflection and reflection and the long flow paths in the housing lower part, the exhaust gas loses a large amount of heat to the housing wall, the baffle plate and the baffle wall. For more intensive cooling, the housing lower part is provided on the outside with cooling ribs for transferring the heat to the ambient air.

The invention will become more readily apparent from the following description thereof on the basis of the accompanying drawings. The drawings illustrate an exemplary embodiment of the invention which is based on a pneumatic multi-purpose valve.

DESCRIPTION OF A PREFERRED EMBODIMENT

Figure 1:
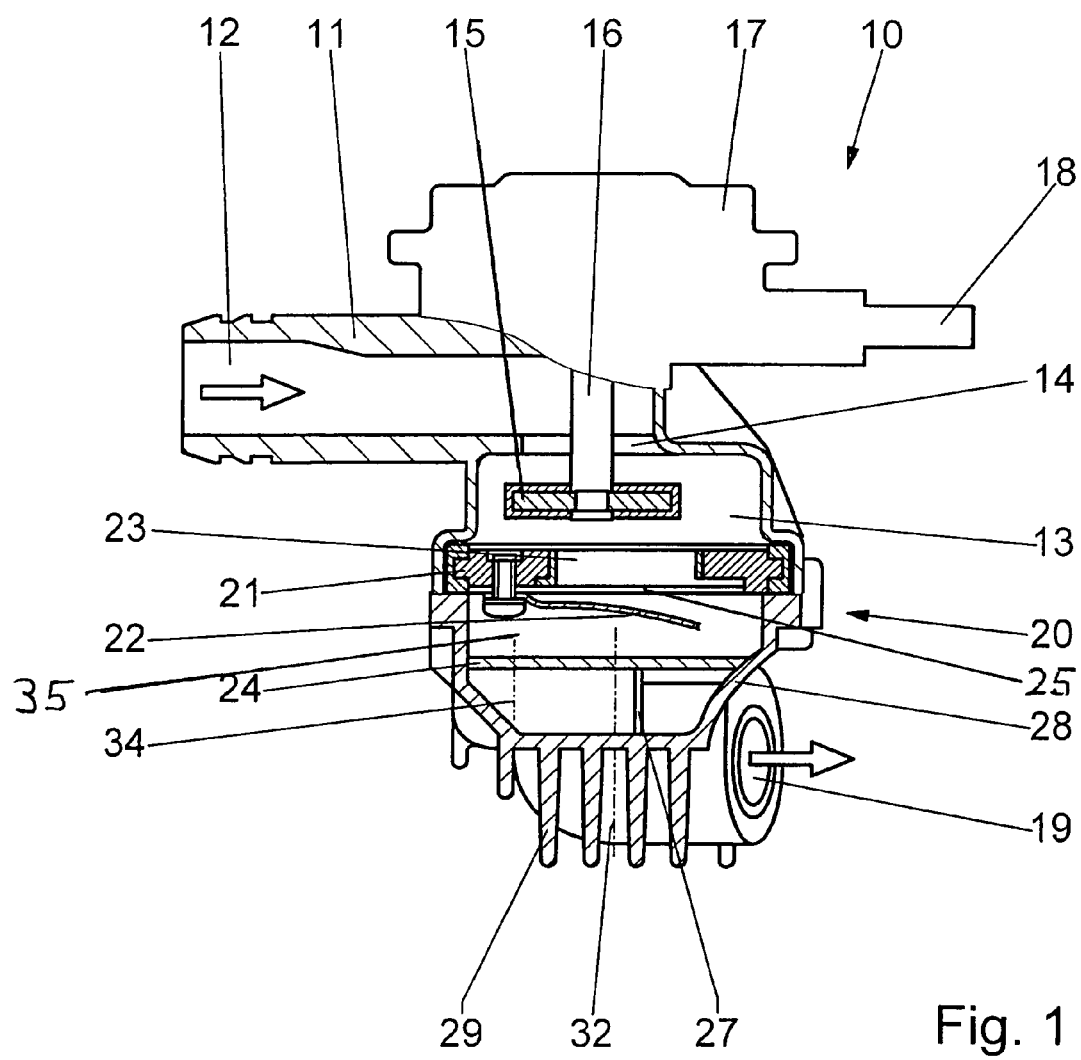
FIG. 1 shows a partial longitudinal section through a multi-purpose valve according to the invention.

The multi-purpose valve 10 possesses a housing which is divided into a housing upper part 11 and a housing lower part 28. The housing upper part 11 comprises an air inlet 12 and a shut off valve, the closing body 15 of which is adapted to close a valve orifice 14. The closing body 15 is actuated in a known way by means of vacuum by an actuating device 17 via a valve rod 16. A vacuum connection of the actuating device 17 is designated by the numeral 18.

Installed in the housing upper part 11 downstream of the closing body 15 in the direction of flow of the secondary air, which is indicated by arrows, is a non-return valve plate 21 of a non-return valve 20. The plate is held between the housing upper part 11 and the housing lower part 28.

The non-return valve 20 of the valve which is under consideration here consists of a non-return valve plate 21 which is inserted into the valve housing and which has a plurality of valve orifices 23 distributed on the circumference. It also includes a reed spring 22 which is fastened as a closing body at one side of the valve orifice at any side of the passage orifice, and a stopper plate 25 for limiting the spring excursion of the reed spring and protecting the latter against direct action by exhaust gas.

Between the valve orifice 14 and the non-return valve plate 21 is a valve chamber 13, into which the closing body 15 extends when the valve orifice 14 is opened (FIG. 1). The non-return valve plate 21 possesses a central valve orifice 23 which is fastened, offset radially in relation to the valve orifice 14, to the non-return valve plate 21 at the outflow side.

Figure 2:
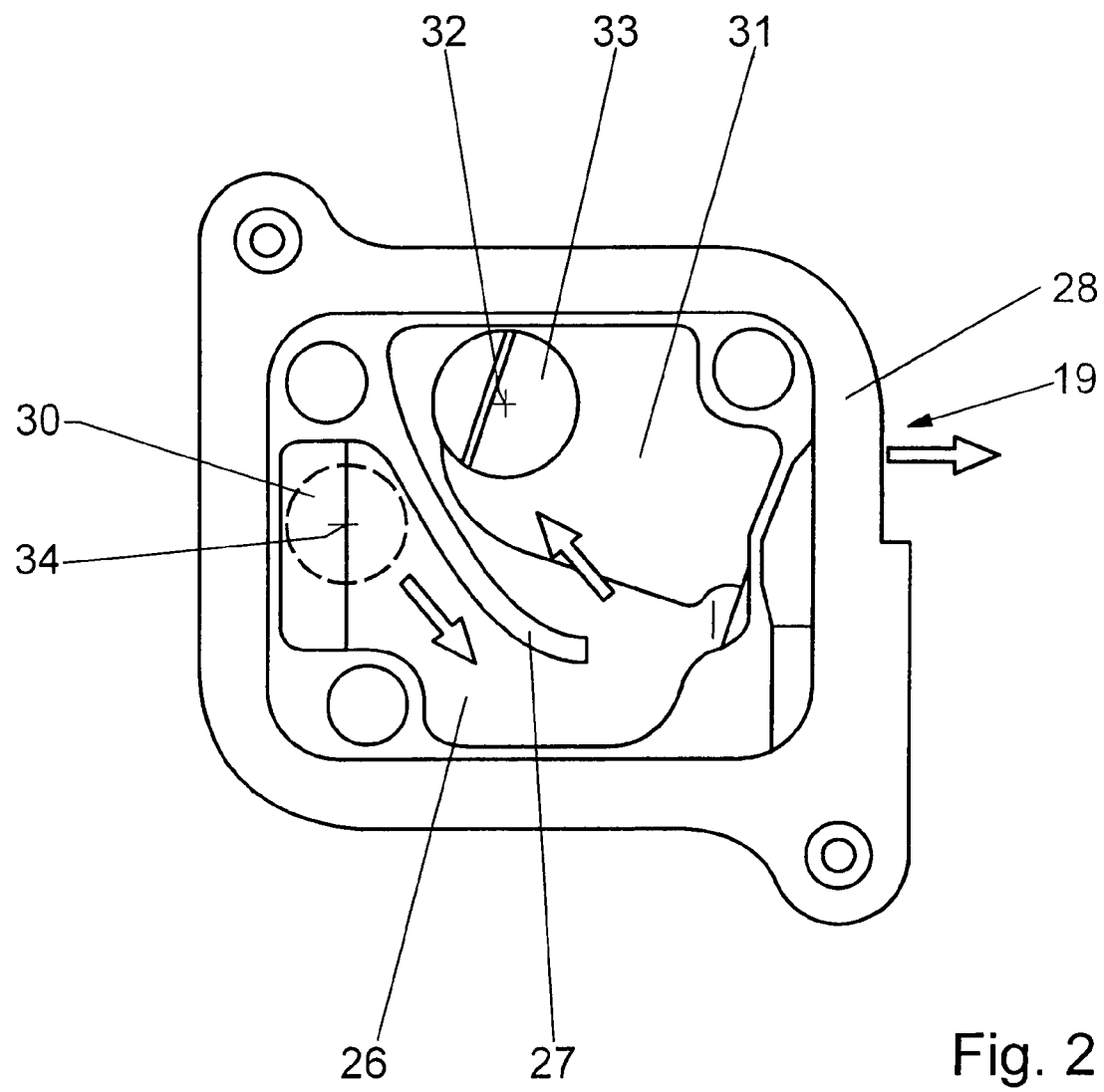
FIG. 2 is a cross-sectional view of a housing lower part, without a baffle plate, of a multi-purpose valve according to the invention.

Provided in the housing lower part 28 is a baffle plate 24 which, in the present instance, extends parallel to the non-return valve plate 21 and therefore transverse to the valve orifice 23 of the non-return valve 20. Said baffle plate separates, with the exception of a passage orifice 30 (FIG. 2), a pre-chamber 35 (FIG. 1) from a deflection chamber 26 (FIG. 2). The center line of the passage orifice 30 is designated by 34 and indicates the position of the passage orifice in FIG. 1. The passage orifice 30 is offset, with respect to the valve orifice of the non-return valve 20, to the side where the diaphragm spring 22 and the stopper plate 25 are fastened to the non-return valve plate 21, so that exhaust gas flowing through the passage orifice 30 into the pre-chamber 35 is deflected at the stopper plate 25 and the diaphragm spring 22 before it can flow through the valve orifice 23, should the diaphragm spring 22 not close the latter in a completely leak-tight manner.

While the passage orifice 30 is arranged on one side of the housing lower part 28, the outlet 19 is located as far as possible from the passage orifice 30 on the other side of the housing lower part 28. The exhaust gas entering through the outlet 19 flows first into the orifice 33. Toward the passage orifice 30 the orifice 33 is in communication with a duct part 31 which leads to the deflection chamber 26 (FIG. 2). To make the position of the passage orifice 30 in relation to the position of the orifice 33 even clearer, the center 32 of the orifice 33 is also indicated in FIG. 1, while the passage orifice 30 is depicted in FIG. 2 by a dashed line with its center line indicated by reference numeral 34.

A baffle wall 27 extends transversely to the baffle plate 24 in the deflection chamber 26 between the passage orifice 30 and the orifice 0.33 of the duct part, so that a direct flow the exhaust gas from the orifice 33 to the passage orifice 30 is prevented, and the exhaust gas has to flow around the baffle wall 27. The exhaust gas stream thus experiences a sharp deflection when it first emerges from the orifice 33, then at the free end of the baffle wall 27, thereafter at the passage orifice 30 and finally at the non-return valve plate 21, with the result that the exhaust gas pressure and the exhaust gas temperature are brought to values within the specification for air injection switching valves. In order to lower the temperature further, the housing lower part 28 possesses, on the outside, cooling ribs 29 which enlarge the heat-exchange surface of the valve housing and consequently contribute to the cooling of the exhaust gas.

The separation between the housing upper part 11 and the housing lower part 28 advantageously extends in the region of the non-return valve plate 21. As a result, on the one hand, the non-return valve 20 can be mounted without much outlay, and, on the other hand, the baffle plate 24 can be inserted into the housing lower part 28 from the separating plane, while the housing lower part 28, together with the duct part 31 and with the baffle wall 27, can be produced relatively simply by die-casting.

Expediently, the passage orifice 30 through the baffle plate 24 is positioned below the stopper plate 25. The diaphragm spring 22 is thereby protected optimally from vibration-exciting exhaust gas pulsations, from compressive and thermal load and from contamination, for example by soot deposits. This effect may be increased by means of a closed form of the stopper plate 25. In addition, even if the diaphragm spring 22 does not close in a completely leak-tight manner, the exhaust gases are forced to flow on a long path around the latter.

At the same time, if required, a desired throttling action may additionally be provided by means of an appropriate choice of the diameter of the passage orifice 30. As a result, the curve characteristic of the secondary-air mass supplied to the engine can be changed and to some extent adapted to the situation. In addition, in the case of V- or W-engines, a better equal distribution of the secondary-air masses supplied to the individual cylinder banks can be achieved by means of the throttling. As a further advantage, the throttling function thus achieved permits the use of the same air pump for more applications.

In the design of the housing lower part 28, which includes the baffle plate 24 and the baffle wall 27, it is necessary to ensure that a free outflow of exhaust gas condensate in the direction of the engine is made possible, in order to avoid an impairment in functioning due to icing-up or unnecessary stress on components caused by aggressive exhaust gas condensate.

The heat removal may be improved by an appropriate design of the cooling ribs 29 with respect to the cooling air generated by the travel wind and/or by the radiator fan, and in that cooling ribs are provided on the outside of the valve housing where the baffle plate 24 and baffle wall 27 are disposed on the inside of the valve housing.

In the structural configuration of the valve housing, including baffle plate 24 and baffle wall 27, it is necessary to ensure that as low a flow pressure loss as possible is generated in the direction of flow of the secondary air (that is to say, the valve inlet to valve outlet direction), in order to affect the efficiency of the secondary-air injection as little as possible. On the other hand, in the opposite direction, as high a resistance as possible is to be provided for the exhaust gas, so that its energy is reduced to a great extent well before it reaches the non-return valve plate 21.

It is necessary to ensure in the configuration of the baffle walls and valve wall surfaces that the exhaust gas is always reflected back in the direction of the engine and is not fed back in the direction of the non-return valve 20. This may be achieved, for example, by means of a concave form and/or corresponding position of the baffle wall surfaces or valve wall surfaces which point in the direction of the valve outlet 19.

In the fastening of the baffle plate 24 to the baffle wall 27 and valve housing, the high loads due to temperature and dynamic pressures must be taken into account in the choice of materials and appropriate means for securing the fastening components must be provided.

What is claimed is:

1. A multi-purpose valve (10) for supplying secondary air to an exhaust system of an internal combustion engine, said valve including a valve orifice (14) disposed between an air connection (12) and an outlet (19) to the exhaust system, a power-actuated closing member (15) controlling the valve orifice (14) and a non-return valve (20) arranged downstream of the closing member (15) in the direction of flow of the air, and baffling devices (24, 26, 27) arranged between the non-return valve (20) and the outlet (19) so as to deflect an exhaust gas flow from the outlet (19) into the valve at least once through at least 90°, said baffling devices (24, 26, 27) including a baffle plate (24) which is arranged transversely to a valve orifice (23) and which separates a prechamber (35) facing the non-return valve (20) from a deflection chamber (26) connected to the outlet (19), a passage orifice (30) being arranged, radially offset in relation to the valve orifice (23) of the non-return valve (20), in the baffle plate (24).

2. A multi-purpose valve as claimed in claim 1, wherein the nonreturn valve (20) possesses a non-return valve plate (21), to which a diaphragm spring (22) which is limited in its deflection by a stopper plate (25) and forms a closing body, which is fastened at one side of the valve orifice (23) and disposed on the side of the passage orifice (30) where the baffle plate (24) is arranged.

3. A multi-purpose valve as claim 1, wherein the outlet (19) is arranged as far as possible from the passage orifice (30) in the direction of flow of the exhaust gas.

4. A multi-purpose valve as claimed in claim 3, wherein the shortest connection between the passage orifice (30) and the outlet (19) toward the passage orifice (30) is blocked by a baffle wall (27) which extends transversely to the baffle plate (24).

5. A multipurpose valve as claimed in claim 1, wherein the housing of the multi-purpose valve (10) is divided in the region of the non-return valve plate (21), parallel to the latter, into a housing upper part (11) and a housing lower part (28), the baffle plate (24), baffle wall (27) and outlet (19) being accommodated in the housing lower part (2B).

6. A multi-purpose valve as claimed in claim 5, wherein the housing lower part (28) has, on the outside, cooling ribs (29).

* * * * *